United States Patent [19]

Terpstra et al.

[11] Patent Number: 4,576,072
[45] Date of Patent: Mar. 18, 1986

[54] SAWDUST COLLECTION APPARATUS FOR A TABLE SAW

[75] Inventors: Daniel A. Terpstra, Kirkwood; Richard B. Brundage, Ladue, both of Mo.

[73] Assignee: Emerson Electric Co., St. Louis, Mo.

[21] Appl. No.: 581,331

[22] Filed: May 14, 1984

Related U.S. Application Data

[62] Division of Ser. No. 312,002, Oct. 16, 1981, abandoned.

[51] Int. Cl.⁴ .................... B27G 19/02; B27G 19/08
[52] U.S. Cl. .................... 83/102.1; 83/100; 83/165; 83/478
[58] Field of Search .............. 83/102.1, 100, 478, 83/544, 165, 167

[56] References Cited

U.S. PATENT DOCUMENTS

| | | | |
|---|---|---|---|
| Re. 20,687 | 4/1938 | Grozier | 83/100 |
| 2,095,330 | 10/1937 | Hedgpeth | 83/102.1 |
| 2,121,069 | 6/1938 | Collins | 83/473 |
| 3,754,493 | 8/1973 | Niehaus | 83/478 |
| 4,184,226 | 1/1980 | Loevenich | 408/67 X |
| 4,201,256 | 5/1980 | Truhan | 83/100 X |

Primary Examiner—James M. Meister
Attorney, Agent, or Firm—Charles E. Markham

[57] ABSTRACT

Sawdust collection apparatus for a motorized table saw includes a specially formed and hinged, table top saw guard and sawdust collector to which one end of a vacuum hose is connected in a manner to admit air bleeding so as to safely lower the vacuum therein when the other end of the hose is connected to a relatively strong vacuum source, a deflector element to be mounted on the swinging saw cradle below the table in the saw base for directing sawdust downwardly to a collector bag, foamed synthetic material for sealing various openings in the saw base and a conveniently removable bracket for supporting the vacuum hose above the saw table.

4 Claims, 14 Drawing Figures

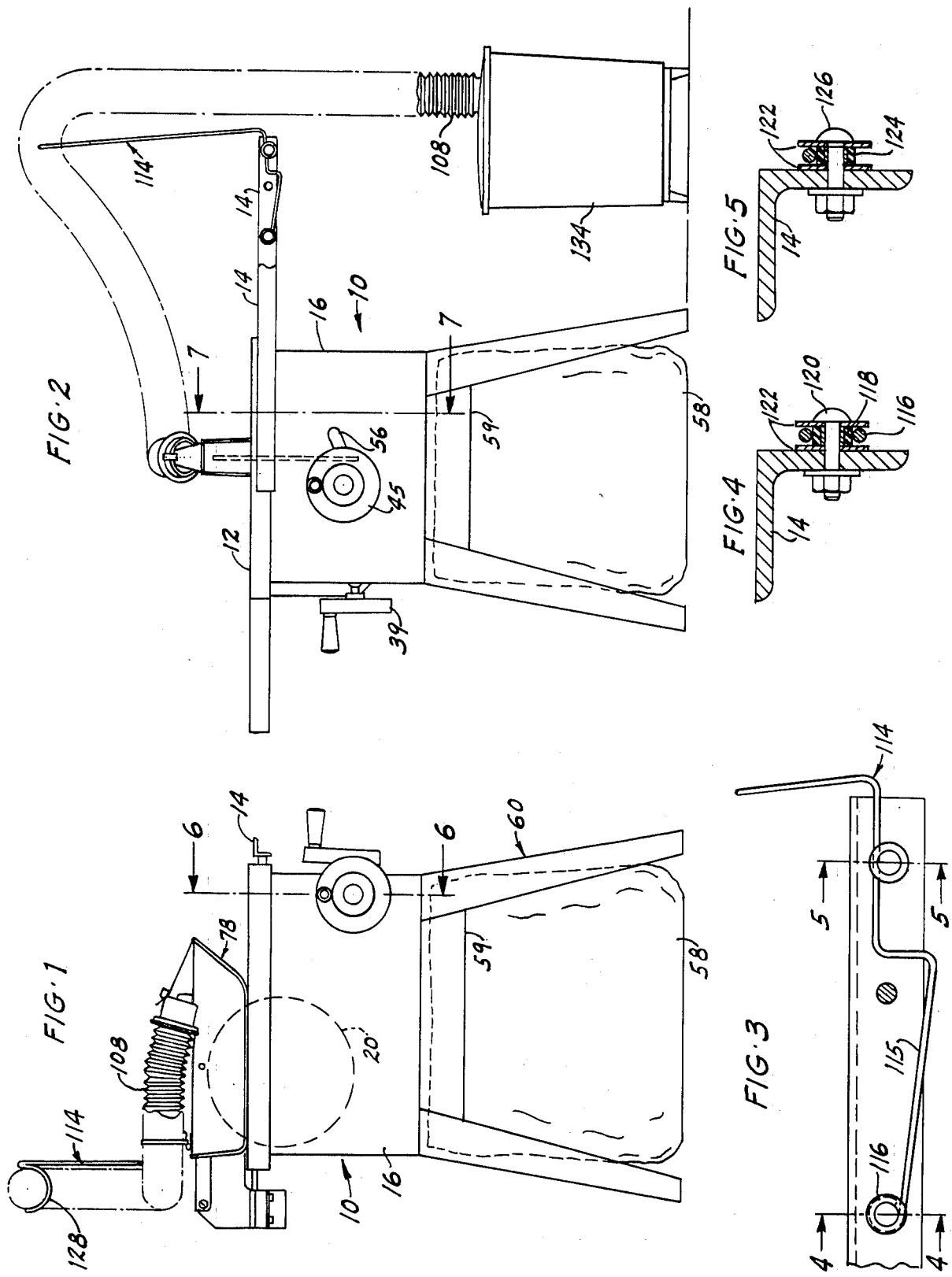

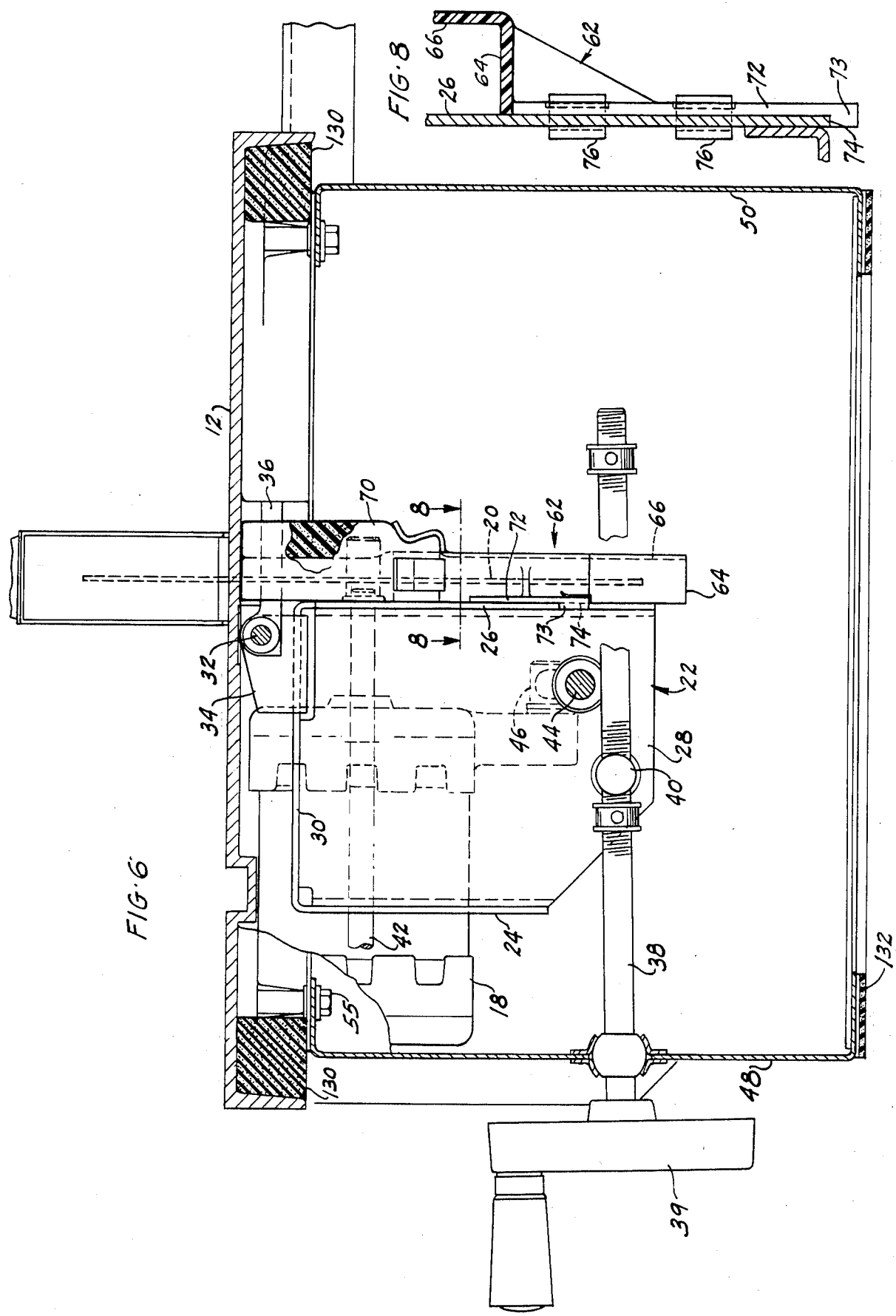

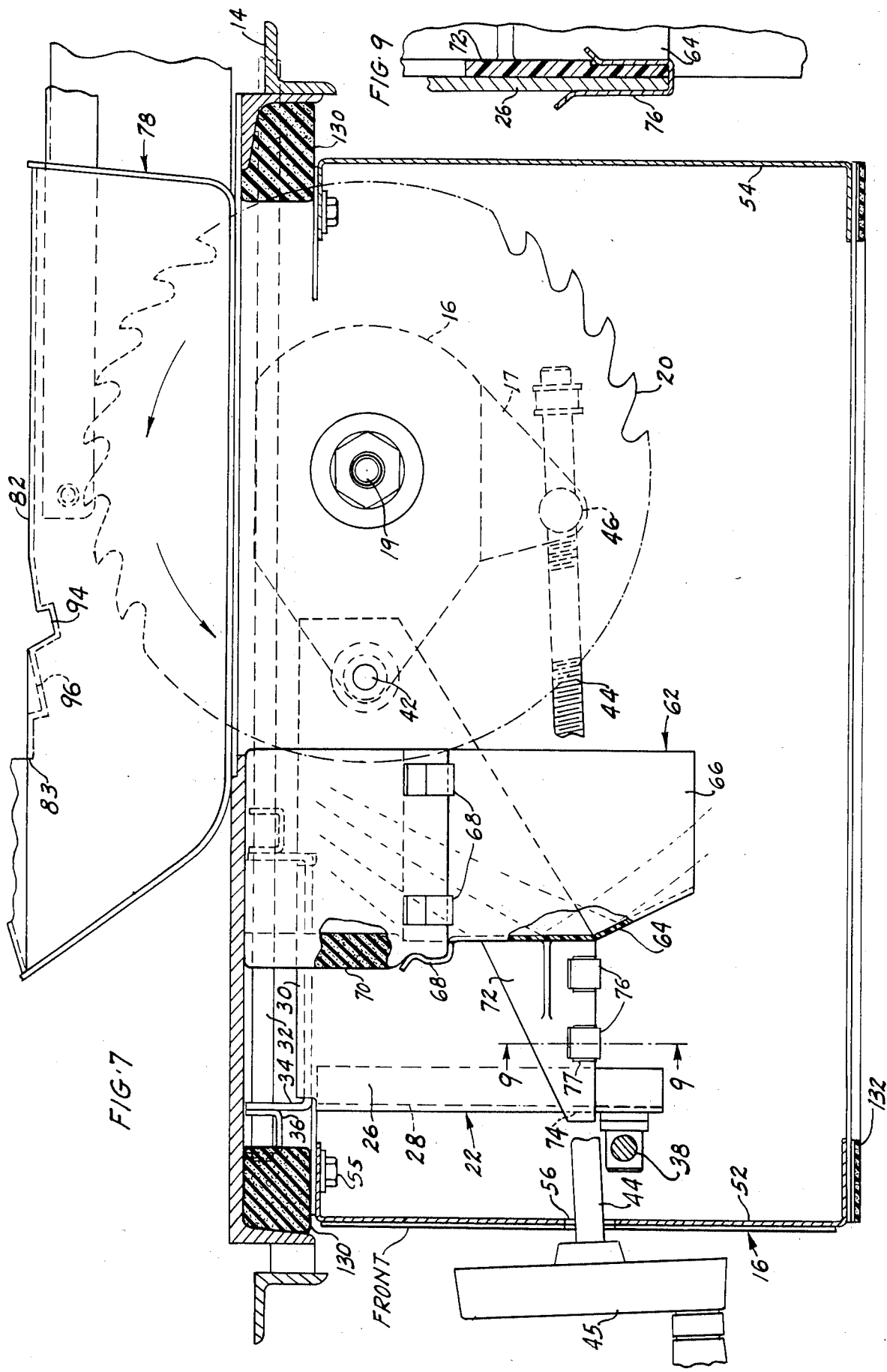

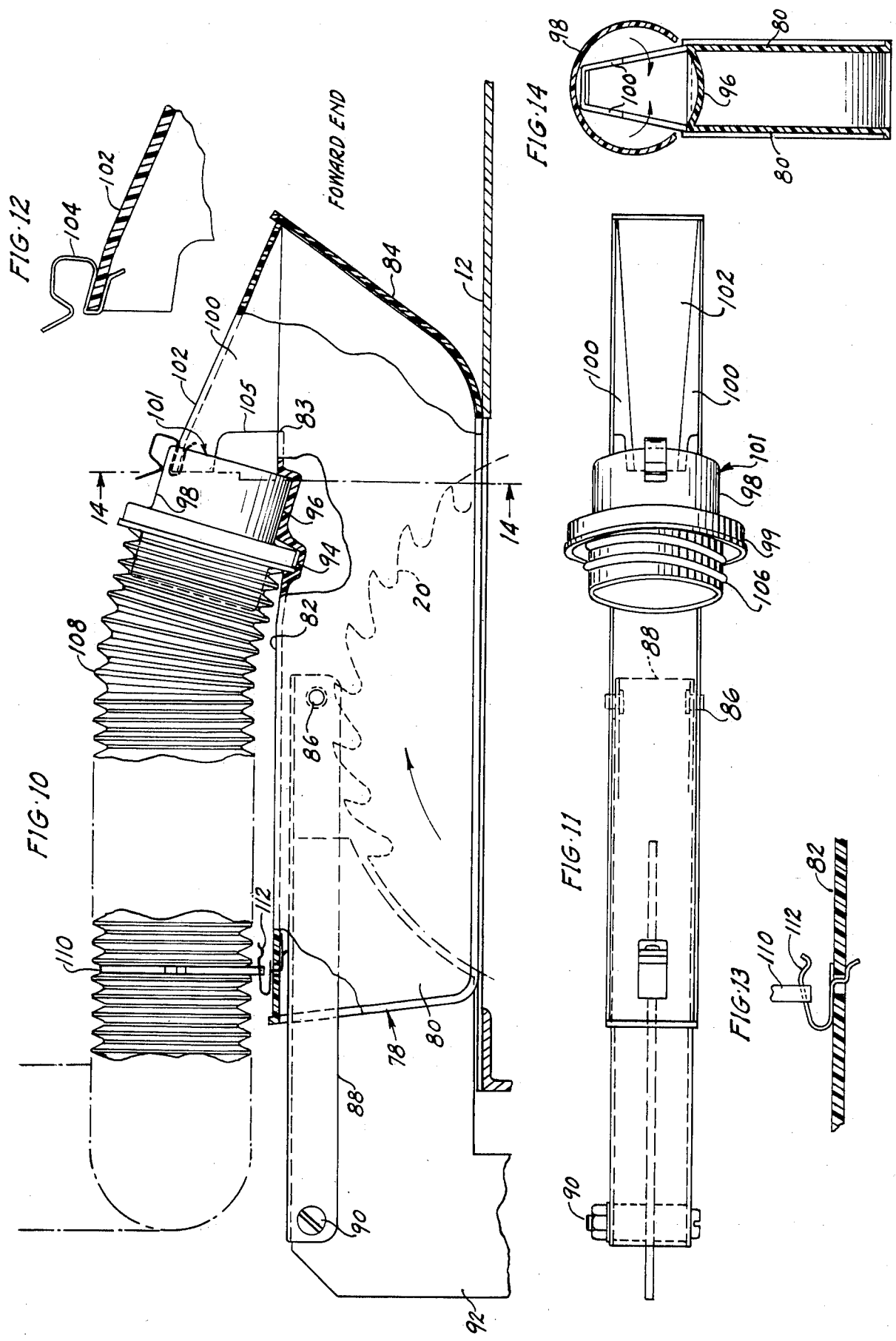

SAWDUST COLLECTION APPARATUS FOR A TABLE SAW

This is a division of application Ser. No. 312,002, filed Oct. 16, 1981, now abandoned.

This invention concerns the provision of means for the collection of all sawdust produced in the operation of a motorized table saw and for preventing the escape of sawdust from the saw table and base.

BACKGROUND OF THE INVENTION

Applicants have found that when attaching one end of a vacuum hose to the usual hinged saw guard and the other end to a relatively strong vacuum source, such as a shop-vac, that small cut off work pieces were likely to be picked up and sometimes drawn into the hose. This not only causes inconvenience it also presents a hazardous situation.

In a U.S. Pat. No. 4,367,655 for a sawdust collection system the joint inventors, Daniel A. Terpstra and Richard B. Brundage, of the present application disclosed a sawdust collection system for a motorized table saw. This earlier disclosure included a flexible hose connected at one end to a hinged saw guard and at its other end to a vacuum source of known capacity comprising a centrifugal blower connected to and driven by an outboard mounted saw driving motor. In this case the capacity of the vacuum source to cause an airflow velocity through a hose of a specific size was known to be low enough to avoid the pickup of small work pieces and it was stated that, "The capacity of the blower and the diameter of the connecting hose is such as to cause a relatively large volume airflow through the saw guard at a relatively low rate of flow so as to collect virtually all of the fine sawdust likely to become airborne without withdrawing any appreciable amount of the larger heavier particles."

In the present invention applicants have provided a specially formed hinged saw guard having provision for the convenient detachable connection thereto of a vacuum hose which permits a sufficient flow of air into the hose from the exterior of the guard as well as from the interior thereby to limit the velocity of airflow through the guard and preclude the picking up of small cut off work pieces when an available, relatively strong vacuum is applied to the other end of the hose. This bleeding of exterior air into the vacuum hose not only reduces the velocity of airflow through the guard to preclude the pickup of small cut off work pieces it also induces the flow into the hose of fine sawdust particles thrown alongside of the guard by the saw blade when the hinged guard is raised from the worktable by a workpiece.

Another problem encountered was the emission of sawdust from the saw base through the sizeable arcuate aperture in the front wall of the base provided to permit the saw elevating screw, which passes therethrough, to swing with the tilting of the saw blade. In the earlier application referred to herein above the applicants provided a strip of foamed material enclosing this arcuate aperture. While this expedient is effective in preventing the escape of sawdust through this aperture, an objectionable amount yet escaped around the elevating screw due to the considerable velocity at which sawdust is thrown toward this aperture by the saw blade. To effectively solve this problem applicants in the present invention have provided a U-shaped deflector tiltable with the saw blade for directing all below table sawdust off the saw blade downwardly into a collector bag attached to the open bottom of the base.

OBJECTS OF THE INVENTION

An object of this invention is to provide a hinged saw guard for a table saw which is formed so as to direct above table sawdust through a rearward facing opening formed therein into the end of a vacuum hose connected thereto;

A further object is to provide the hinged saw guard with means for positioning and for conveniently detachably connecting the end of the vacuum hose thereto;

A further object is to limit the vacuum applied through the vacuum hose to the inside of the saw guard by bleeding air from outside the guard into the connected end of the hose;

A further object is to provide deflector means movable with the saw blade in beveling positions for causing below table sawdust thrown forwardly by the saw blade to be directed downward into a collector bag;

A further object is to provide means for supporting a length of vacuum hose above the worktable which means may be conveniently moved out of the way when it interferes with sawing of a long workpiece;

A further object is to seal various openings in the casing forming the base of a table saw with pieces of foamed material;

Further objects and advantages will appear from the following description when read in connection with the accompanying drawings.

In the Drawings

FIGS. 1 and 2 are respectively side and front elevational views of a motorized table saw equipped with sawdust collection apparatus constructed and applied thereto in accordance with the present invention;

FIGS. 3, 4 and 5 are enlarged fragmentary, detail views of the vacuum hose support bracket showing the means for mounting it on the rear rip fence rail;

FIG. 6 is an enlarged cross-sectional view of the table saw shown in FIGS. 1 and 2 with the legs deleted and is taken along line 6—6 of FIG. 1;

FIG. 7 is an enlarged cross-sectional view of the table saw with the legs deleted and is taken along line 7—7 of FIG. 2;

FIG. 8 is a still further enlarged fragmentary cross-sectional view of the sawdust deflector element and is taken along line 8—8 of FIG. 6;

FIG. 9 is a fragmentary cross-sectional view of the deflector element showing the method of connecting it to the cradle wall by clips, and is taken along line 9—9 of FIG. 7;

FIG. 10 is an enlarged side elevational view, with parts shown in section, of the hinged saw guard and attached vacuum hose;

FIG. 11 is a top plan view of the saw guard shown in FIG. 10 with the vacuum hose deleted but with the hose connector shown in detachably connected position;

FIG. 12 is an enlarged fragmentary, detail view showing the hose attaching clip fixed to the saw guard for the detachable connection of the hose connector;

FIG. 13 is an enlarged fragmentary, detail view showing the clip attached to the saw guard for detachably connecting an intermediate portion of the vacuum hose to the saw guard, and FIG. 14 is a cross-sectional view of the saw guard and vacuum hose connector and is taken along line 14—14 of FIG. 10.

DESCRIPTION OF A PREFERRED FORM OF THE INVENTION

Referring to the drawings, sawdust collection apparatus constructed in accordance with the present invention is shown assembled on a conventional commercially available, motor driven table saw generally indicated at 10. The table saw has a worktable 12 with front and rear sides and rip fence rails 14 extending along the front and rear sides thereof and attached thereto. A base 16 below the worktable is rectangular in plan and forms a casing enclosing a saw driving motor 18 having a drive shaft 19 to which is attached a circular saw blade 20. A pivoted saw cradle generally indicated at 22 on which the motor and saw blade are mounted for movement with the cradle in saw blade beveling positions and are pivotally mounted for saw blade elevating positions in which a peripheral portion of the saw blade is variably positioned above the worktable. The saw blade 20 is arranged to rotate counter clockwise as viewed in FIG. 7, that is, with the upper and forward peripheral portions thereof moving forward and downward.

Referring to FIGS. 6 and 7 the cradle 22 has two opposite, parallel and vertical sidewalls 24 and 26, a front wall 28 and a top wall 30. The top wall 30 is attached to a horizontal rod 32 by integrally formed tabs 34 and the rod 32 is in turn journalled for rotation in brackets 36 fixed to the saw table 12. The cradle 22 may therefore be swung left or right to various saw bevel positions about the axis of rod 32 by rotation of a bevel screw 38 engaged in a nut 40 pivotally mounted in the front wall 28 of the cradle 22.

The motor 18 and the saw blade 20 attached to the motor drive shaft 19 are mounted on a shaft 42 which is journalled in the opposite sidewalls 24 and 26 of the cradle so that the motor and attached saw blade may also be rotated to various elevational positions by the rotation of an elevating screw 44 engaged in a nut 46 pivotally mounted in an extension 17 of the motor frame. The arrangement is such that the saw blade 20 is parallel with, positioned adjacent and spaced outwardly from the cradle sidewall 26. The saw base 16 has opposite vertical sidewalls 48 and 50, vertical front and rear walls 52 and 54 and is open at the top and bottom. The upper and lower edge portions of the vertical base sidewalls and front and rear walls are formed horizontally and are overlapped and connected by screw means (not shown). The upper overlapped edges of the base walls are spaced downwardly from the saw table 12 and connected thereto by screws 55.

The elevating screw 44, see FIG. 7, extends through the front wall 52 of the base and has a hand wheel 45 attached to the exterior end thereof. In order to permit arcuate movement of the screw 44 when the cradle is tilted to various saw bevel positions an arcuate slot 56 is provided in the front base wall 52. Inasmuch as below table sawdust is thrown forward toward the front wall of the saw base and the slot 56 therein with considerable force by the saw blade this becomes the major point of sawdust leakage from the base. A sawdust collector bag 58 has its open end attached to the open base bottom. The open end of bag 58 is connected to the skirt 59 of a leg set 60 for convenient detachment and replacement preferably in a manner shown and described in FIGS. 17 to 19 in U.S. Pat. No. 4,367,665 referred to above.

To prevent below table sawdust from being thrown forwardly by the sawblade toward slot 56 applicants have provided an L-shaped deflector element generally indicated at 62, which in conjunction with the cradle sidewall 26 to which it is attached, forms a U-shaped deflector shrouding the downwardly moving peripheral portion of the rotating saw blade. The two parallel legs of this U-shaped deflector extending parallel with and on opposite sides of the saw blade and with the vertically arranged, perpendicular connecting leg positioned outward from a downwardly moving peripheral portion of said saw blade to effectively deflect all below table sawdust off the saw blade downwardly into the collector bag 58. The deflector element 62 is preferably formed as a molding of relatively rigid synthetic plastic and is of general L shape having a short leg 64 and a long leg 66. The short leg 64 lies perpendicular to and coextends vertically with the cradle sidewall 26 and has its edge abutting this cradle wall. The long leg 66 is parallel to cradle wall 26 and coextends vertically and horizontally rearward therewith. The deflector legs 64 and 66 also extend downward below the lower edge of cradle sidewall 26. The short deflector leg 64 is of such length that it spaces the longer leg 66 outwardly from cradle wall 26 substantially twice the distance that the saw blade is spaced from cradle wall 26.

At its upper end deflector 62 is provided with detached and outwardly formed integral clip elements 68 on both legs which coextend vertically with upper end portions of the legs 64 and 66. A sheet of easily deformable material 70 such as foamed rubber has its lower edge portion retained between upper end portions of legs 64 and 66 and clip elements 68 whereby the sheet 70 conforms to the L shape of the deflector element. The sheet 70 extends upwardly from the legs 64 and 66 of deflector 62 to the under side of the saw table 12 and provides an easily deformable upward extension of the deflector 62 which permits tilting of the cradle.

The deflector 62 is also provided with an integral connector leg 72 which extends perpendicularly from the edge of short leg 64 and lies flat against the cradle sidewall 26. A thickened portion 73 at the forward end of connector leg 72 provides a shoulder 74 which lies against the forward edge of wall 26 and thereby locates the position of the deflector horizontally. The lower edge of connector leg 72 is aligned with the lower edge of cradle sidewall 26 and a pair of spring clip elements 76 hold the connector leg 72 and the edge of short deflector leg 64 firmly against the cradle wall 26, see FIGS. 7 and 9. The clip elements 76 are located by insertion in slight depressions 77 in the face of leg 72.

To effectively collect the mostly fine sawdust which is thrown upward and forward above the worktable by the saw blade applicants have provided a uniquely formed hinged saw guard generally indicated at 78 arranged for the positioning and convenient detachable connection of the end of a rearward extending flexible vacuum hose to a forward end portion thereof. The forward end portion of the guard being formed so as to direct sawdust rearwardly through a rearward facing opening into the vacuum hose and so as to admit sufficient air to flow into the vacuum hose from outside the guard to avoid the pickup of small cut off work pieces. Referring to FIGS. 10 and 11 the horizontally disposed elongated saw guard 78 normally rests on worktable 12 and has rear and forward ends and is preferably formed as a molding of rigid, transparent, synthetic plastic material. The guard 78 has two spaced parallel, longitudinally extending vertical sidewalls 80 with their lower horizontal edges normally resting on worktable 12 and joined at their upper edges by a horizontal top wall 82 and at their forward edges by an inclined front end wall 84. End wall 84 extends from bottom to top edges of vertical sidewalls 80 and diverges forwardly from the bottom edge at an acute angle to the vertical. The guard 78 is open at its rear end and is pivotally connected intermediately of its length at 86 to an arm 88 which in turn is pivotally connected rearwardly of the guard at 90 to a spreader 92. The spreader 92 is connected to the rotatable rod 32 (in a manner not shown) so as to tilt to various bevel positions with the saw blade.

The horizontal top wall 82 extends forward from the rear end of the guard to a forward end 83 which forward end is spaced rearward from the front end wall 84. Near its forward end the top wall 82 is provided with longitudinally extending and longitudinally spaced, depressions 94 and 96. Depressions 94 and 96 are arranged to fittingly receive the intermediate flange 99 and forward end portion 98 of a conventional, commercially available, relatively rigid, hollow cylindrical hose connector generally indicated at 101. The bottom of longitudinally extending depression 96 is arcuate with its axis on a line which diverges upward and rearward from the horizontal at an acute angle and the axis of the hollow cylindrical hose connector 101 coincides with this axis when the forward end portion 98 thereof is resting in arcuate depression 96. The bottom of depression 94 extends laterally straight across the top wall 82 and receives the flange 94 and is substantially the axial length of flange 99 whereby the connector 101 is axially located.

The vertical sidewalls 80 have upwardly extending forward end portions 100 which converge upward and have top edges which converge rearward and are connected by a top wall portion 102. The sidewall portions 100 and connecting top wall portion 102 extend rearward from the top of front end wall 84 to the forward end of arcuate depression 96. The rearward converging top edges of sidewall portions 100 and connecting top wall portion 102 extend rearward from the top of front end wall 84 at approximately the same angle as the axis of connector 101 when its portion 98 rests in depression 96 and the rear edges of sidewall portions 100 are vertical. Rear end portions of sidewall portions 100 and top wall 102 enter the forward end portion 98 of hose connector 101 due to its inclined position. The forward end portion 98 of the connector 101 is of such diameter and wall thickness that the narrowed rear end portion of top wall 102 lies contiguous with an upper inner wall portion thereof when a lower diametrically opposed, exterior wall portion thereof is resting in arcuate depression 96. A spring clip 104 firmly attached to the rear end of top wall portion 102, as by crimping, see FIG. 12, receives and holds the hose connector 101 in position with its axis approximately parallel to top wall 102.

The side and top wall portions 100 and 102 form an upper passageway at the forward end of the saw guard with a rearward facing opening through which above worktable sawdust off the saw blade is caused to flow into the hose connector 101 by airflow created by rotation of the saw blade in the absence of a source of vacuum. The spacing of sidewall portions 100 and their upward convergence permits ample air from the exterior of the guard to flow into hose connector 101 when a vacuum is applied to a hose connected to the hose connector thereby considerably reducing the vacuum applied to the interior of the saw guard. Cutouts 105 in the rear ends of sidewall portions 100 may be varied in size to admit more or less bleeding of exterior air into hose connector 101. The upper convergence of sidewall portions 100 and the rearward convergence of their upper edges results in a narrow rear end portion of top wall portion 102 rendering it adaptable to the entering and connection to the wall of portion 98 of hose connector 101.

The hose connector 101 has a rear threaded portion 106 for the attachment thereto of one end of a flexible, spirally convoluted vacuum hose 108. From the connector 101 the hose 108 extends rearward along the top wall 82 of the guard and is fastened thereto. A strap 110 encircling the hose 108 and a spring clip 112 fixed to the top wall 82 near its rear end retains the strap 110 and provides a convenient detachable connection of the hose 108 to the top wall 82. From this connection the hose 108 extends horizontally and upwardly along the rear side of the saw table to the semi-circular formed upper end of a wire hose support bracket generally indicated at 114.

Referring to FIGS. 2 to 5 the support bracket 114 has a generally horizontal portion 115 terminating at its left end in a loop or eye 116. The eye 116 is mounted for rotation on a rubber bushing 118 fastened to the rear rip fence rail 14 by a bolt 120 and is held in position on bushing 118 by a pair of washers 122. Near its right end the portion 115 rests on a similar rubber bushing 124 connected to the rail 14 by a bolt 126 and is held in position on bushing 124 by a pair of washers 122. At the right end of portion 115 the bracket is formed generally perpendicular and extends vertically from portion 115 and terminates at its upper end in a semi-circular portion 128 for receiving hose 108 and supporting it well above the saw table. When it becomes necessary to lower the hose support bracket 114 and move the hose out of the way to avoid interference with an unusually long workpiece to be sawed the right end of bracket portion 115 is merely lifted from its seat on bushing 124 and lowered.

Referring to FIGS. 6 and 7, the spaces between the upper horizontally formed and overlapped edges of the side, front and rear walls of the saw base and the underside of the saw table are closed by strips of foamed material 130 and the lower horizontally formed and overlapped edges of these walls are provided with adhesively applied strips 132 of foamed material. The arcuate slot 56 in the front wall 52 of the saw base is preferably closed by a strip of foamed material (not shown) attached to the wall 52 in a manner shown in FIGS. 5 and 6 of the drawings in applicants' earlier application referred to herein above.

In FIG. 2 the remote end of hose 108 is shown connected to a source of vacuum such as a conventional shop-vac 134. The saw guard 78 with the vacuum hose 108 connected thereto in the manner shown and described is effective in the absence of such vacuum source in collecting table top sawdust due to airflow generated by the relatively rapid rotation of the saw blade. When a vacuum source is not employed the remote end of the hose 108 may be connected to a suitable receptacle.

We claim:

1. In a table saw having a horizontal worktable with front and rear sides, a circular saw blade mounted below the worktable and having a peripheral portion thereof extending above the worktable rotating toward the front side of said worktable and a spreader having a portion extending above the rear side of the worktable; the improvement which comprises the provision and hinged attachment to said spreader portion of an elongated saw blade guard and table top sawdust collector having rear and forward ends and extending between said rear and front sides of said worktable and normally resting on said worktable and shrouding said peripheral saw blade portion, said hinged attachment including an arm pivotally connected at one end to said guard intermediately of its length and pivotally connected at its other end to said spreader portion whereby the forward end of said guard or said entire guard may be elevated above said worktable, said guard comprising a pair of vertical sidewalls having upper and lower horizontal edges and extending the length of said guard, an inclined forward end wall and a horizontal top wall connecting said upper sidewall edge and extending from the rear end of said guard to a forward end spaced rearward from said forward end wall, a pair of sidewall portions extending upward from the upper edges of said sidewalls and extending longitudinally from said forward end of said top wall to said forward end wall, and a top wall portion connecting the longitudinally extending upper edges of said sidewall portions whereby said top wall, said sidewall portions and said top wall portion defines a rearward facing opening, and a length of flexible hose having one end connected via a hose connected to a wall defining said opening and said hose having an adjoining end portion extending rearward and resting on and attached to said horizontal top wall.

2. The improvement claimed in claim 1 in which said forward end wall extends from said lower to upper edges of said sidewalls and is inclined forward from said lower edge at an acute angle to the vertical, in which said upper longitudinal edges of said sidewall portions and said top wall portion connecting them extend rearward and upward from the top of said forward end wall at an acute angle to the horizontal, in which an arcuate depression having an axis parallel with said top wall portion is formed in said top wall at its forward end, a hollow cylindrical hose connector resting in said depression with its axis substantially parallel with said top wall portion and with the rearward end of said top wall portion extending into and lying contiguous with an internal surface portion of said hose connector, and spring clip means detachably connecting said hose connector to said rear end of said top wall portion.

3. The improvement claimed in claim 2 in which the spacing of said sidewalls and said upwardly extending sidewall portions defining the sides of said opening is substantially less than the inside diameter of said hollow cylindrical hose connector thereby providing apertures at opposite sides of said hose connector to permit substantial airflow into said hose connector from the exterior of said guard when a vacuum is applied to said hose.

4. The improvement claimed in claim 1 which includes a bracket for supporting an intermediate portion of said length of hose above said worktable, said bracket being generally L-shaped with the end of its shorter, horizontal leg pivotally connected to a rear edge of said worktable below the upper surface thereof for rotation on a horizontal axis and said leg being supported in a horizontal position on a support spaced horizontally from said pivotally connected end, the vertical longer leg of said bracket extending above said worktable and having an arcuate upper end for receiving and supporting said hose, and said horizontal leg being sufficiently flexible laterally to permit convenient lateral displacement from said support member thereby to permit rotation of said entire bracket to a position below the upper surface of said worktable.

* * * * *